United States Patent
Shin et al.

(10) Patent No.: US 9,828,525 B2
(45) Date of Patent: Nov. 28, 2017

(54) COLOR COATING COMPOSITION FOR LED LAMP DIFFUSER AND COLOR-COATED GLASS ARTICLE USING THE SAME

(71) Applicant: SHINCERAMIC CO., LTD., Gyeonggi-do (KR)

(72) Inventors: Jae Soo Shin, Gyeonggi-do (KR); Hyeon Bae, Gyeonggi-do (KR); Hee Chul Shin, Gyeonggi-do (KR); Je Hune Chang, Gyeonggi-do (KR); Seung Pyo Hong, Gyeonggi-do (KR)

(73) Assignee: SHINCERAMIC CO., LTD., Gyeonggi-do (KR)

( * ) Notice: Subject to any disclaimer, the term of this patent is extended or adjusted under 35 U.S.C. 154(b) by 120 days.

(21) Appl. No.: 14/727,787

(22) Filed: Jun. 1, 2015

(65) Prior Publication Data

US 2015/0344736 A1    Dec. 3, 2015

(30) Foreign Application Priority Data

May 30, 2014 (KR) .................. 10-2014-0065820

(51) Int. Cl.
| | | |
|---|---|---|
| C03C 17/30 | (2006.01) | |
| C09D 183/08 | (2006.01) | |
| C09D 183/14 | (2006.01) | |
| F21K 99/00 | (2016.01) | |
| C08K 3/10 | (2006.01) | |
| C03C 17/32 | (2006.01) | |
| C08K 3/22 | (2006.01) | |
| C08K 3/26 | (2006.01) | |
| C08K 3/30 | (2006.01) | |
| C08K 3/16 | (2006.01) | |
| C08K 3/00 | (2006.01) | |
| C08K 3/34 | (2006.01) | |

(52) U.S. Cl.
CPC ............ *C09D 183/14* (2013.01); *C03C 17/30* (2013.01); *C03C 17/322* (2013.01); *C08K 3/10* (2013.01); *C09D 183/08* (2013.01); *F21K 9/17* (2013.01); *C08K 3/0033* (2013.01); *C08K 3/16* (2013.01); *C08K 3/22* (2013.01); *C08K 3/26* (2013.01); *C08K 3/30* (2013.01); *C08K 3/34* (2013.01); *C08K 2003/162* (2013.01); *C08K 2003/222* (2013.01); *C08K 2003/2206* (2013.01); *C08K 2003/2227* (2013.01); *C08K 2003/2237* (2013.01); *C08K 2003/2289* (2013.01); *C08K 2003/2293* (2013.01); *C08K 2003/2296* (2013.01); *C08K 2003/265* (2013.01); *C08K 2003/3009* (2013.01); *C08K 2003/3027* (2013.01); *C08K 2003/3036* (2013.01)

(58) Field of Classification Search
CPC .................................................... C08K 3/0033
See application file for complete search history.

(56) References Cited

U.S. PATENT DOCUMENTS

| | | | |
|---|---|---|---|
| 2006/0052477 A1* | 3/2006 | Kessel | C08G 18/8175 522/184 |
| 2009/0027895 A1 | 1/2009 | Daimon et al. | |
| 2015/0258571 A1* | 9/2015 | Lindsay | B65D 35/08 222/107 |
| 2016/0230015 A1* | 8/2016 | Law | C09D 5/00 |

FOREIGN PATENT DOCUMENTS

| | | |
|---|---|---|
| JP | 2009-032563 A | 2/2009 |
| KR | 10-0910658 B1 | 8/2009 |

\* cited by examiner

*Primary Examiner* — Marc Zimmer
(74) *Attorney, Agent, or Firm* — IP Legal Services, LLC

(57) ABSTRACT

Disclosed herein are a color coating composition for an LED lamp diffuser and a color-coated glass article using the same. The color coating composition is capable of increasing durability and a life of an LED lamp, satisfactorily maintaining an external appearance and a lighting quality thereof for a long time, and realizing various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency.

11 Claims, 4 Drawing Sheets

COLOR COATING COMPOSITION FOR LED LAMP DIFFUSER AND COLOR-COATED GLASS ARTICLE USING THE SAME

CROSS-REFERENCE TO PRIOR APPLICATION

The present application claims priority under 35 U.S.C. §119 to Korean Patent Application No. 10-2014-0065820 (filed on May 30, 2014).

BACKGROUND OF THE INVENTION

Field of the Invention

The present invention relates to a color coating composition for an LED lamp diffuser and a color-coated glass article using the same, and more particularly, to a color coating composition for an LED lamp diffuser, capable of increasing durability and a life of an LED lamp, satisfactorily maintaining an external appearance and a lighting quality thereof for a long time, and realizing various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency, and a color-coated glass article using the same.

Description of the Related Art

Lamps are used for various purposes such as decoration and visual display in addition to a lighting purpose for lighting darkness. Lamps such as incandescent lamps or fluorescent lamps using filaments have been mainly used until now. However, since most of power consumption is released as heat in the lamps, energy used for actual lighting is only 5 to 30% of the used power. For this reason, the lamps have low energy efficiency and a short service life.

Accordingly, an LED lamp using an LED having low power consumption and a long service life is recently spotlighted. In general, the LED lamp may have reduced energy consumption of ⅕ or less compared to the incandescent lamp or of ⅓ or less compared to the fluorescent lamp, and have an increased life more than 100 times that of the incandescent lamp or more than 10 times that of the fluorescent lamp. The LED lamp which is currently released as a product is generally manufactured to have an external appearance similar to the conventional lamp such as the incandescent lamp or the fluorescent lamp so as to be used as it is in an existing lighting fixture. For example, a fluorescent lamp type LED lamp is shown in FIG. 1.

As shown in the drawing, a conventional LED lamp has a structure in which a substrate 23 having a plurality of LEDs 21 is disposed inside a main body 10 and a cover 30 is coupled to the main body 10 so as to cover the front of the LEDs 21. Connection pins for supplying power to the LEDs 21 are provided at both sides of the main body 10, and thus the LED lamp may be connected to a fluorescent lighting fixture in a manner similar to an existing fluorescent lamp and be used.

Since each LED is generally a point light source, the LED lamp requires a diffuser for broadly diffusing light of the LED in order to prevent glare and provide uniform lighting. For this reason, the cover 30 serves as a diffuser 30 which is made of synthetic resin having light diffusivity so as to be bloomed by adding a dispersing agent to PC (polycarbonate) instead of a simple light transmission material.

In addition, since the LED is weak to heat, performance of the LED is rapidly deteriorated when the LED is used at a temperature greater than an optimal temperature. Accordingly, there is a need for a heat sink capable of rapidly dissipating heat generated when the LED is actuated. Although the LED has improved heat resistance and reduced operating heat according to technical development, heat may not be effectively radiated through the diffuser 30 made of synthetic resin. Therefore, the conventional LED lamp necessarily requires the heat sink. In addition, the heat sink may be further required since the diffuser 30 itself is very weak to heat. Thus, the main body 10 serves as a heat sink 10 made of a metal material such as aluminum.

As described above, the conventional LED lamp has a structure in which the synthetic resin-made diffuser 30 is coupled to the metal-made heat sink 10.

However, since the diffuser 30 is made of synthetic resin which is weak to heat and light (particularly, ultraviolet light), the diffuser 30 is deformed and discolored and has poor strength and light transmittance due to heat and light generated during operation of the LEDs 21 and due to solar heat/sunlight radiated according to an installation environment and heat and light applied from the surroundings. For this reason, a lighting quality and an external appearance of the conventional LED lamp are deteriorated for a short time and the LED lamp has a short service life due to poor durability.

In addition, since the conventional LED lamp has a structure in which the heat sink 10 and the diffuser 30 are separately manufactured and assembled to each other and particularly the heat sink 10 is made of a metal material requiring a considerable material and processing cost, there is a problem in that productivity is lowered and manufacturing cost is high.

Although not separately illustrated, a bulb type and other types of LED lamps are a structure in which a metal-made heat sink is coupled to a synthetic resin-made diffuser. Therefore, the LED lamps also have the above-mentioned problems.

SUMMARY OF THE INVENTION

Accordingly, the present invention is directed to a color coating composition for an LED lamp diffuser and a color-coated glass article using the same that substantially obviate one or more problems due to limitations and disadvantages of the related art.

An object of the present invention is to provide a color coating composition for an LED lamp diffuser, capable of increasing durability and a life of an LED lamp, satisfactorily maintaining an external appearance and a lighting quality thereof for a long time, and realizing various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency, and a color-coated glass article using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with an aspect of the present invention, a color coating composition for an LED lamp diffuser includes: 80 wt % of a binder solution; 15 wt % to 19 wt % of ceramic filler; and 1 wt % to 5 wt % of an inorganic pigment.

The binder solution may contain 10 wt % to 30 wt % of a solvent component in modified urethane silicone resin.

The solvent component may include any one selected from the group including toluene, acetone isobutylacetate, butyle cellosolve, and xylene.

The ceramic filler may include one or more components selected from the group including calcium carbonate, calcium oxide, calcium fluoride, silica dioxide, diatomite, magnesium oxide, aluminum oxide, and zinc oxide.

The inorganic pigment may include any one selected from the group including C.I. Pigment Red 108, Cadmium zinc sulfide, C.I. Pigment Greed 50, and C.I. Pigment Blue 28.

In another aspect of the present invention, there is provided a color-coated glass article coated with a color coating composition for an LED lamp diffuser, the color-coated glass article being formed by coating the coating composition in a constant thickness on an inner surface of a transparent glass tube of a specified shape.

The inorganic pigment may include any one selected from the group including C.I. Pigment Red 108, Cadmium zinc sulfide, C.I. Pigment Green 50, and C.I. Pigment Blue 28.

The color-coated glass article may be formed by increasing ambient temperature by 10° C. a minute and respectively holding the temperature conditions for 5 minutes from room temperature to 100° C. to 200° C. followed by a cooling and curing process.

As is apparent from the above description, the present invention may increase durability and a life of an LED lamp, satisfactorily maintain an external appearance and a lighting quality thereof for a long time, and realize various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EMBODIMENTS

Figure 1:
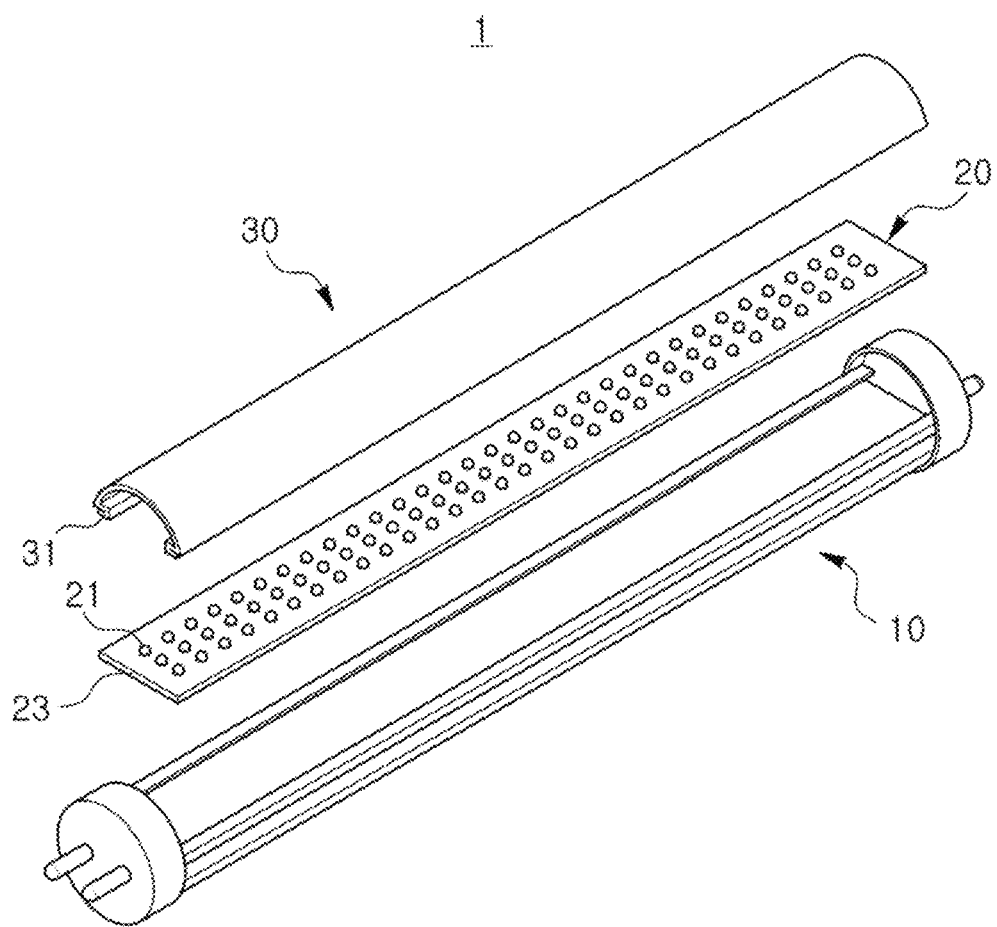
FIG. 1 is a view illustrating a conventional LED lamp.

Exemplary embodiments of the present invention will be described below in more detail with reference to the accompanying drawings.

It should be understood that the following specific structural and functional descriptions are merely examples given for the purpose of providing a description of the exemplary embodiments according to the concept of the present invention. Accordingly, various variations may be performed on the exemplary embodiments of the present invention, and it should be understood that the scope and spirit of the present invention will not be limited only to the exemplary embodiments presented in the description of the present invention set forth herein.

Since various variations may be performed on the exemplary embodiments according to the concept of the present invention and the embodiments of the present invention can be realized in a wide range of varied forms, specific exemplary embodiments of the present invention will be described herein in detail with reference to the appended drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the appended drawings of the present invention.

Furthermore, the terms including expressions, such as first and/or second, used in the specification of the present invention may be used to describe various elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Other expressions for describing relationships between elements, for example, "between" and "immediately between" or "neighboring" and "directly neighboring" may also be understood likewise.

The terminology used in the specification of the present invention is for the purpose of describing particular embodiments only and is not intended to limit the invention. As used in the specification and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
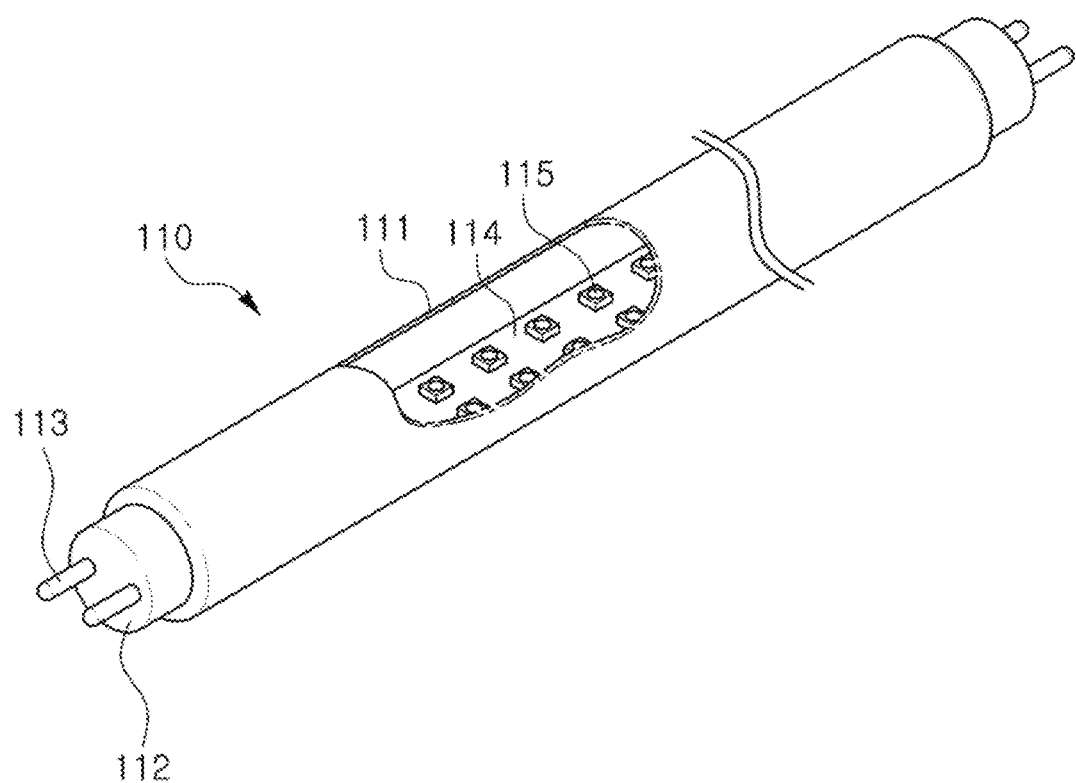
FIG. 2 is a perspective view illustrating an LED lamp diffuser according to an embodiment of the present invention, the LED lamp diffuser being applied to a fluorescent lamp type LED lamp.
Figure 3:
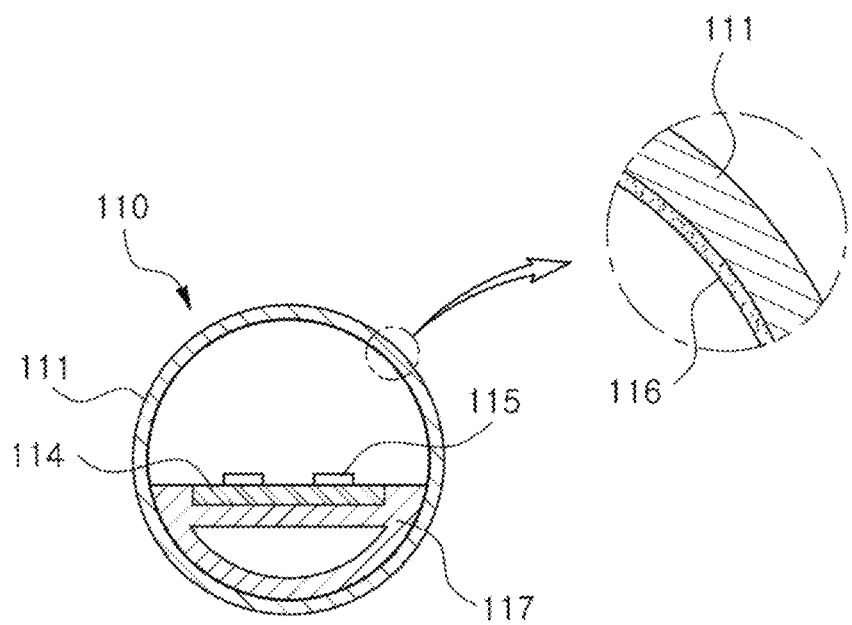
FIG. 3 is a cross-sectional view illustrating the LED lamp shown in FIG. 2.

As shown in FIGS. 2 and 3, a diffuser 116 according to an embodiment of the present invention is formed in such a manner to be applied to an inner surface of a glass tube 111 which is similar to a glass tube forming an existing typical fluorescent lamp and has an elongated tubular shape having a circular cross-section.

An LED lamp 110 having an external appearance similar to the fluorescent lamp may be manufactured in such a manner that LEDs 115 are disposed inside the glass tube 111 and bases 112 having connection pins 113 are coupled to both longitudinal ends of the glass tube 111.

As in a typical LED lamp, the plurality of LEDs 115 are mounted on a substrate 114 to be connected to the connection pins 113 through the substrate 114.

When the connection pins 113 are connected to power terminals of a typical lighting fixture and power is supplied to the LEDs 115, the LEDs 115 emit light. In this case, light of each LED 115 is diffused while penetrating the diffuser 116 applied to the glass tube 111, so that lighting is uniformly performed without glare.

In addition, heat generated by operation of the LED 115 may be radiated to the outside through the glass tube and the diffuser 116.

To effectively radiate the heat, a heat transfer medium 117 made of a typical material such as metal or silicon having high thermal conductivity may be provided between a back surface portion of the substrate 114 and an inner peripheral surface of the glass tube 111.

Meanwhile, the shape of the glass tube 111 is exemplarily illustrated in the drawing. However, the glass tube 111 may have various tubular shapes such as a U-shape, an L-shape, a curved shape, and a circular shape in addition to the linear shape, such that a connection means of the LED lamp is connected to one side or two or more ends of a typical lighting fixture having various structures. In addition, the glass tube may have another shape besides the tubular shape so as to be used for a bulb type LED lamp 120 shown in FIG. 4, and the bulb type LED lamp 120 may also be formed by applying and coating a diffuser onto an inner peripheral surface of a glass bulb 121 having various shapes.

Figure 4:
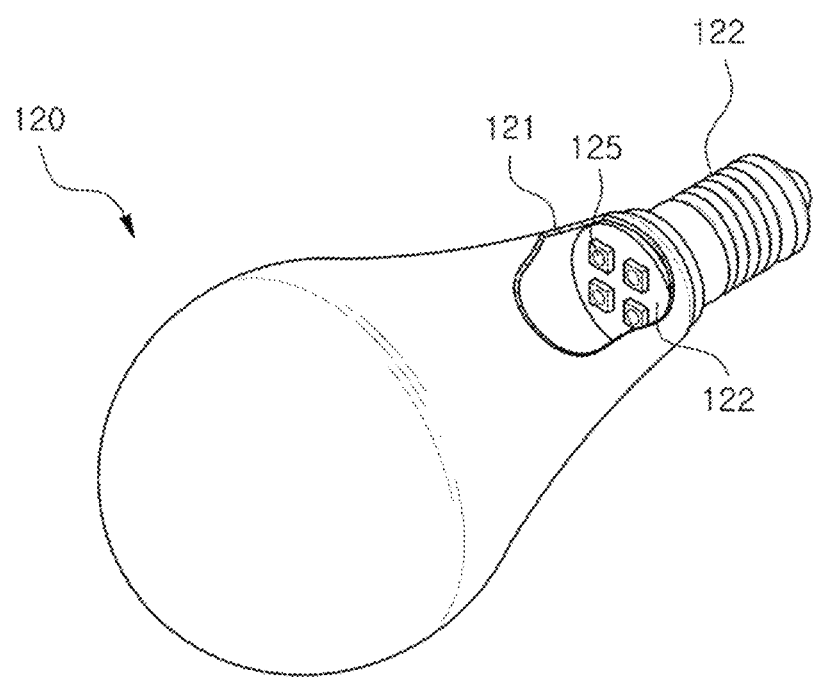
FIG. 4 is a perspective view illustrating an LED lamp diffuser according to another embodiment of the present invention, the LED lamp diffuser being applied to a bulb type LED lamp.

The LED lamp 120 in FIG. 4 has a structure in which a base 122 for power connection is coupled to one side of a bulb type diffuser 121 and a plurality of LEDs 125 are arranged on a substrate 124 in the inside of the LED lamp. In the following description, the diffuser will be designated only by reference numeral "116".

The diffuser 116 is composed of a coating composition configured as follows so as to satisfy physical and chemical properties such as light transmittance, chromaticity, haze, heat resistance, and strength which are required for the diffuser 116.

Here, a haze value is expressed by converting a value obtained by dividing diffuse transmittance by total transmittance into a percentage. The haze value being increased means that there is a greater amount of scattered light by diffusion without transmittance via direct light from a light source.

Thus, the haze value being of 100% means that light transmittance is entirely performed through diffusion, which is preferably suitable for a diffuser material for a lamp.

On the contrary, parallel transmittance is expressed as a value obtained by subtracting diffusion transmittance from total transmittance, meaning transmittance via direct-light. The higher the parallel transmittance is, the more the glaring via direct-light is, which means it is not suitable for a material for a lamp.

Further, it is appropriate for a material for a lamp to have a total transmittance of 70 to 80%, because too low total transmittance, obtained by a short distance between an LED source and a diffuser plate, causes light intensity to be reduced, whereas higher total transmittance causes internal light source devices and modules themselves to be viewed.

Since a diffuser may ideally perform its function when the haze value and the parallel transmittance are respectively kept constant, a coating composition for an LED lamp diffuser ideally satisfying the conditions on the haze value and parallel transmittance, a manufacturing method thereof, and a color-coated glass article formed using the method will now be described.

In the present invention, a color coating composition is formed by a combination of 80 wt % of a binder solution, 15 wt % to 19 wt % of ceramic filler, and 1 wt % to 5 wt % of an inorganic pigment.

The binder solution contains 10 wt % to 30 wt % of a solvent component in modified urethane silicone resin, wherein the modified urethane silicone resin contains AEROSIL.

The solvent component may comprise any one selected from the group including toluene, acetone isobutylacetate, butyle cellosolve, and xylene. The ceramic filler may comprise one or more components selected from the group including calcium carbonate, calcium oxide, calcium fluoride, silica dioxide, diatomite, magnesium oxide, aluminum oxide, and zinc oxide.

Here, the ceramic filler may preferably use calcium carbonate, calcium oxide, and calcium fluoride.

The inorganic pigment comprises any one selected from the group including C.I. Pigment Red 108, Cadmium zinc sulfide, C.I. Pigment Greed 50, and C.I. Pigment Blue 28.

Meanwhile, a glass article coated with a coating composition for a diffuser material for an LED lamp is formed by coating the coating composition in a constant thickness on an inner surface of a transparent glass tube of a specified shape.

The coating composition is coated in a thickness ranging from 13 μm to 25 μm.

The color-coated glass article is formed by increasing ambient temperature by 10° C. a minute and respectively holding the temperature conditions for 5 minutes from room temperature to 100° C. to 200° C. followed by a cooling and curing process.

As shown in Table 1 below, there are other compositions including the binder solution, the ceramic filler and the inorganic pigment.

For example, the compositions shown in Table 1 may be made different such that the contents of the ceramic filler change according to the contents of the inorganic pigment. Here, the respective contents may have one or more contents.

TABLE 1

| Component | Example of Composition (wt %) | | | | |
|---|---|---|---|---|---|
| | a | b | c | d | e |
| Binder Solution | 80 | 80 | 80 | 80 | 80 |
| Ceramic Filler | 19 | 18 | 17 | 16 | 15 |
| Inorganic Pigment Red (C.I. Pigment Red 108) | 1 | 2 | 3 | 4 | 5 |

The coating composition is prepared as follows.

According to the present invention, a method of manufacturing a color coating composition for a diffuser material for an LED lamp includes: (1) adding ceramic filler and an inorganic pigment to an amount of a binder solution; and (2) forming a coating solution by stirring the solution while pulverizing the ceramic filler and the inorganic pigment added to the solution.

The stage (2) is carried out by a ball mill provided in a mixer.

The stage (2) is carried out at room temperature for 30 minutes such that the particle size of the ceramic filler becomes 2 μm to 4 μm.

As such, different coating compositions are obtained by the method, and they are tested with respect to haze and transmittance according to the thickness thereof.

Experimental Example 1

The color-coated glass article was formed by respectively coating the coating solutions with different compositions as shown in Table 1 in a thickness of 13 μm on inner surfaces of transparent glass tubes, increasing ambient temperature by 10° C. a minute from room temperature to 150° C. and holding it for 5 minutes, and cooling and curing the coating solutions.

The resultant color-coated glass articles were tested with respect to haze and transmittance thereof using measuring methods according to JIS K 7136 (ISO 14782) and JIS K 7361 (ISO 13468) and 555 nm visible rays. Table 2 shows test results by Experimental Example 1.

TABLE 2

| Test Items | a | b | c | d | e |
|---|---|---|---|---|---|
| Haze | 84.19 | 86.25 | 87.92 | 87.97 | 91.22 |
| Parallel Transmittance | 12.69 | 10.58 | 8.56 | 7.84 | 5.12 |
| Diffusion Transmittance | 67.56 | 66.36 | 62.31 | 57.35 | 53.22 |
| Total Transmittance | 80.25 | 76.94 | 70.87 | 65.19 | 58.34 |

As shown in Table 2, although all the ceramic fillers and inorganic pigments exhibited generally excellent results, especially Examples a, b, and c showed high total transmittance and haze, implying that the composition ideally has the content of the inorganic pigment of not more than 3 wt %.

Thus, it could be seen that when the color coating compositions with different compositions were used as the LED lamp diffuser, they were selectively availably used in various conditions (e.g. light intensity required in indoor and outdoor conditions) in order to suit to consumers' tastes.

In order to specifically test whether the calcium-based compositions containing the inorganic pigment prepared by Experimental Example 1 showed excellent properties with respect to haze and transmittance, the haze and transmittance of the coating compositions formed in the same compositions as Table 1 by the same method as that described above were tested, while changing the thickness thereof coated on the transparent glass tube.

Experimental Example 2

The coating compositions a and c, which showed excellent properties in Experimental Example 1, were coated in thicknesses of 20 μm and 25 μm, respectively, and were tested with respect to haze and transmittance thereof using measuring methods according to JIS K 7136 (ISO 14782) and JIS K 7361 (ISO 13468) and 555 nm visible rays. Table 3 shows test results by Experimental Example 2.

TABLE 3

| Test Items | a-20 | a-25 | c-20 | c-25 |
|---|---|---|---|---|
| Haze | 85.59 | 92.56 | 84.55 | 90.55 |
| Parallel Transmittance | 9.11 | 4.27 | 9.92 | 5.55 |
| Diffusion Transmittance | 54.12 | 53.11 | 54.27 | 53.18 |
| Total Transmittance | 63.23 | 57.38 | 64.19 | 58.73 |

As shown in Table 3, it could be seen that when examples a and c had increased coating thicknesses, respectively, total transmittance were relatively reduced, whereas hazes were increased, and that when the coating thickness was maintained at 25 μm or less, the total transmittance was maintained at 50% or more, being availably stably used as a diffuser.

Further, in order to various color, the coating solution having the composition b, which satisfies the color as the LED lamp diffuser, were tested, while changing the types of inorganic pigments shown in Table 1.

Table 4 below shows the test results of the compositions using the compositions and method shown in Experimental Example 1, while changing the types of the inorganic pigments.

TABLE 4

| Items | | Experimental Example 2 | | | | |
|---|---|---|---|---|---|---|
| | | 1 | 2 | 3 | 4 | 5 |
| Organic Binder Solution | | 80 | 80 | 80 | 80 | 80 |
| Ceramic Filler | | 20 | 18 | 18 | 18 | 18 |
| Inorganic Pigment | C.I. Pigment Red 108 | — | 2 | — | — | — |
| | Cadmium Zinc Sulfide | — | — | 2 | — | — |
| | C.I. Pigment Green 50 | — | — | — | 2 | — |
| | C.I. Pigment Blue 28 | — | — | — | — | 2 |
| Color | | White | Red | Yellow | Green | Blue |
| Test Items | Haze (%) | 86.60 | 86.25 | 86.52 | 86.09 | 85.69 |
| | Parallel Trans- | 10.35 | 10.58 | 10.18 | 10.86 | 11.25 |

TABLE 4-continued

| | Experimental Example 2 | | | | |
|---|---|---|---|---|---|
| Items | 1 | 2 | 3 | 4 | 5 |
| mittance (%) | | | | | |
| Diffusion Transmittance (%) | 66.89 | 66.36 | 65.34 | 67.20 | 67.36 |
| Total Transmittance (%) | 77.24 | 76.94 | 75.52 | 78.06 | 78.61 |

As a result shown in Table 4, it could be seen that when the content of the ceramic filler was maintained while maintaining constant content of the inorganic pigments for each color, the total transmittance and haze were maintained excellent while providing various colors.

Thus, when the color coating compositions according to the present invention were used as the LED lamp diffuser, it is possible to provide various colors while satisfying excellent transmittance.

As shown in Experimental Examples, when employing the coating compositions, the manufacturing method thereof, and the coated-glass article according to the present invention, various excellent properties of the coating composition can be obtained while satisfying consumers' tastes.

Figure 5:
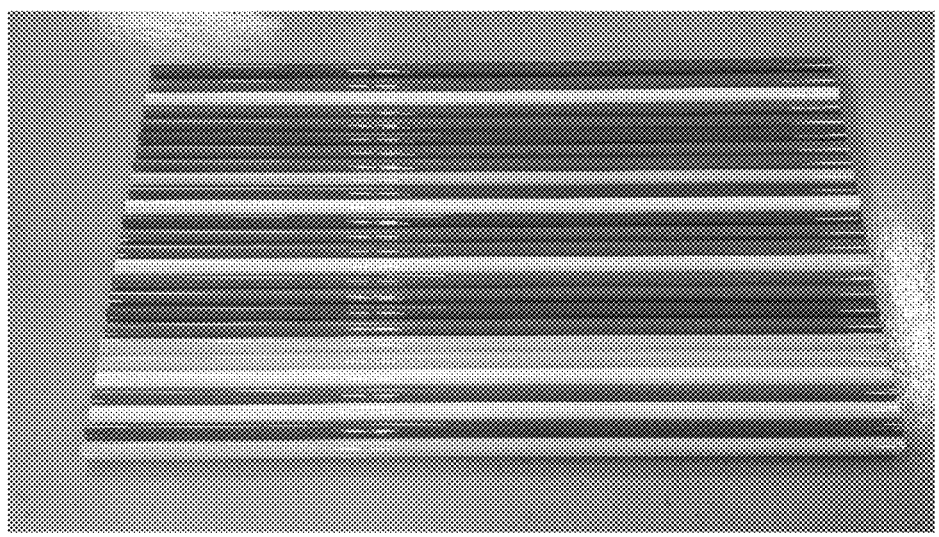
FIGS. 5 and 6 are photographs illustrating color-coated glass articles manufactured by the present invention.
Figure 6:
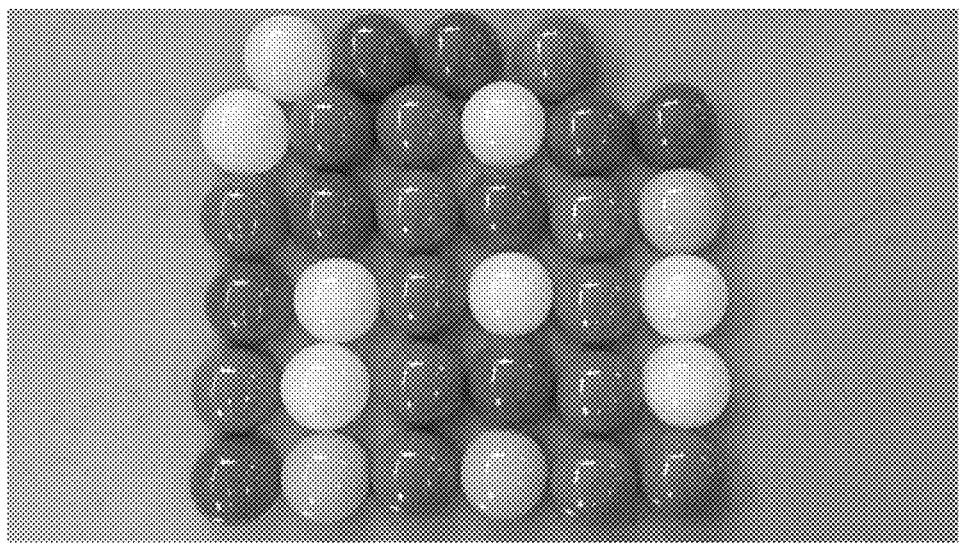

FIGS. 5 and 6 show photographs illustrating color-coated glass articles manufactured by coating of the color coating compositions of the present invention, thereby providing the glass articles with various colors.

Although embodiments have been described with reference to a number of illustrative embodiments thereof, it should be understood that numerous other modifications and applications may be devised by those skilled in the art that will fall within the intrinsic aspects of the embodiments.

More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A color coating composition, comprising:
   80 wt % of a binder solution; 15 wt % to 19 wt % of ceramic filler; and 1 wt % to 5 wt % of an inorganic pigment, and wherein the binder solution contains 10 wt % to 30 wt % of a solvent component in modified urethane silicone resin.

2. The color coating composition according to claim 1, wherein, the solvent component comprises any one selected from the group including toluene, acetone isobutylacetate, butyl cellosolve, and xylene.

3. The color coating composition according to claim 1, wherein the ceramic filler comprises one or more components selected from the group including calcium carbonate, calcium oxide, calcium fluoride, silica dioxide, diatomite, magnesium oxide, aluminum oxide, and zinc oxide.

4. The color coating composition according to claim 1, wherein the inorganic pigment comprises any one selected from the group including C.I. Pigment Red 108, Cadmium zinc sulfide, C.I. Pigment Green 50, and C.I. Pigment Blue 28.

5. An LED light device, comprising:
   a glass tube coated with a color coating composition, wherein the color coating composition comprises 80 wt % of a binder solution, 15 wt % to 19 wt % of ceramic filler, and 1 wt % to 5 wt % of an inorganic pigment;
   a heat transfer medium disposed within the color coated glass tube;
   a substrate disposed on the heat transfer medium; and
   at least one LED mounted on the substrate,
   wherein the binder solution contains 10 wt % to 30 wt % of a solvent component in urethane silicone resin.

6. The LED light device according to claim 5, wherein, the solvent component comprises any one selected from the group including toluene, acetone isobutylacetate, butyl cellosolve, and xylene.

7. The LED light device according to claim 5, wherein the ceramic filler comprises one or more components selected from the group including calcium carbonate, calcium oxide, calcium fluoride, silica dioxide, diatomite, magnesium oxide, aluminum oxide, and zinc oxide.

8. The LED light device according to claim 5, wherein the inorganic pigment comprises any one selected from the group including C.I. Pigment Red 108, Cadmium zinc sulfide, C.I. Pigment Green 50, and C.I. Pigment Blue 28.

9. A method of coating a glass article, comprising:
   coating a color coating composition at a constant thickness on an inner surface of a transparent glass tube, wherein the color coating composition comprises 80 wt % of a binder solution, 15 wt % to 19 wt % of ceramic filler, and 1 wt % to 5 wt % of an inorganic pigment, wherein the binder solution contains 10 wt % to 30 wt % of a solvent component in urethane silicone resin.

10. The method according to claim 9, wherein the color coating composition is coated in a thickness ranging from 13 μm to 25 μm.

11. The method according to claim 9, further comprising:
   heating the color coated glass article by increasing the temperature by 10° C. a minute until the temperature reaches between 100° C. to 200° C.;
   holding the temperature between 100° C. to 200° C. for 5 minutes;
   cooling the color coated glass article; and
   curing the color coated glass article.

\* \* \* \* \*